United States Patent
Iwase et al.

(10) Patent No.: US 6,226,263 B1
(45) Date of Patent: May 1, 2001

(54) ATM NETWORK EXTERNALLY CONTROLLED FOR NETWORK RESOURCE RESERVATION OF END-TO-END SWITCHED VIRTUAL CONNECTION

(75) Inventors: Toshio Iwase, Tokyo; Hisazumi Tsuchida; Masayoshi Nose, both of Kanagawa; Shinichi Nakashima, Tokyo, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/986,993

(22) Filed: Dec. 8, 1997

(30) Foreign Application Priority Data

Dec. 6, 1996 (JP) .................................................. 8-326549

(51) Int. Cl.$^7$ ................................................. H04L 12/26
(52) U.S. Cl. ........................................... 370/231; 370/398
(58) Field of Search ................................. 370/229, 230, 370/231, 232, 233, 234, 235, 236, 252, 253, 395, 398, 399, 422, 426, 468, 477; 709/223, 224, 225, 226

(56) References Cited

U.S. PATENT DOCUMENTS

| | | | |
|---|---|---|---|
| 5,267,232 | * 11/1993 | Katsube et al. | 370/230 |
| 5,479,402 | 12/1995 | Hata et al. | 370/60.1 |
| 5,687,167 | * 11/1997 | Bertin et al. | 370/254 |
| 5,745,694 | * 4/1998 | Egawa et al. | 709/225 |
| 5,784,358 | * 7/1998 | Smith et al. | 370/230 |
| 5,970,062 | * 10/1999 | Bauchot | 370/345 |
| 6,041,038 | * 3/2000 | Aimoto | 370/229 |

FOREIGN PATENT DOCUMENTS 0629065  12/1994 (EP) .
6-30021  2/1994 (JP) .

OTHER PUBLICATIONS

European Search Report (in English) issued Jan. 24, 2000 in a related application.

* cited by examiner

Primary Examiner—Wellington Chin
Assistant Examiner—Kwang B. Yao
(74) Attorney, Agent, or Firm—Ostrolenk, Faber, Gerb & Soffen, LLP

(57) ABSTRACT

In an ATM network, a data base is provided in a network controller for holding data pertaining to network topology and remaining network resource. The controller has a supervisory circuit that constantly monitors communication links between ATM switches. Route decision and resource reservation logic circuitry updates the data base if a network fault condition is detected by the supervisory circuit also. The logic circuitry receives, from a source terminal, a reservation request indicating a reservation of an end-to-end network resource between a scheduled start time and a scheduled end time, and makes a search through the data base to reserve the network resource in the data base if the network resource is available. The logic circuit causes the ATM switches to establish an end-to-end connection using the reserved network resource at the scheduled start time, informs the source terminal of a VCI/VPI of the established connection for subsequent transmission of messages, releases the established connection when the request in the registration memory indicates the scheduled end time, and removes the request from the registration memory. The logic circuit also accommodates class of service requests; for a first class, the database is searched, and requested resources are reserved at the time the request is received. For a second class, the search is not made until the scheduled start time.

16 Claims, 3 Drawing Sheets

NETWORK CONTROLLER 2

ATM NETWORK EXTERNALLY CONTROLLED FOR NETWORK RESOURCE RESERVATION OF END-TO-END SWITCHED VIRTUAL CONNECTION

BACKGROUND OF THE INVENTION

1. Field of the Invention

The present invention relates generally to asynchronous transfer mode (ATM) networks, and more specifically to the reservation of network resources in an ATM network in response to users' requests.

2. Description of the Related Art

Japanese Laid-Open Patent Specification Hei-6-30021 discloses time-scheduled communications in a switched network in which ATM switching nodes individually perform reservation of a bandwidth according to user's reservation requests by storing reservation requests in memory and monitoring the stored requests in order to establish a connection at requested time of day if network resource is available. After the connection is established, the ATM switches monitor the stored request in order to release it at the expiry of the reservation.

Since the prior art resource reservation is implemented individually on a per-node basis and no facility is available to link the reservation data between ATM switches, network reservation cannot be performed on an end-to-end basis. In addition, network resource reservation is attempted at the very instant at which the scheduled communication begins. Although the prior art is provided with means for rejecting some calls if they occur during a predetermined interval prior to the scheduled communication, there is some degree of uncertainty to satisfy the reservation request at the beginning of the scheduled communication. Furthermore, if the ATM switches fail to satisfy a reservation request at the beginning of the scheduled communication, there is no fallback procedure for continuing the search for the requested network resource.

SUMMARY OF THE INVENTION

It is therefore an object of the present invention to provide a solution to the problems associated with ATM switches for making a reservation of network resource.

According to a first aspect of the present invention, there is provided a network controller for making a resource reservation in a network formed by a plurality of ATM switches interconnected by communication links. The network controller comprises a data base for holding data pertaining to network topology and remaining network resource, a supervisory circuit for constantly monitoring the communication links, a registration memory, and route decision and resource reservation logic circuitry. The logic circuitry updates the data base if a faulty condition is detected by the supervisory circuit and receives, from a source terminal, a reservation request indicating a reservation of an end-to-end network resource between a scheduled start time and a scheduled end time, making a search through the data base to reserve the network resource in the data base if the network resource is available. The logic circuit causes the ATM switches to establish an end-to-end connection using the reserved network resource at the scheduled start time, informs the source terminal of a virtual channel identifier/virtual path identifier of the established connection to be used for subsequent transmission of messages, releases the established connection when the request stored in the registration memory indicates the scheduled end time and removes the request from the registration memory.

According to a second aspect of the present invention, the reservation request further indicates one of first and second reservation classes, and the logic circuitry is arranged to make a search through the data base, if the request is indicating the first class, to determine whether the network resource is available immediately following the receipt of the request, reserve the network resource and cause the ATM switches to establish the connection using the reserved network resource at the scheduled start time if the network resource is available, and is further arranged to make a search through the data base, if the request is indicating the second class, to determine whether the network resource is available at the scheduled start time, and cause the ATM switches to establish the connection using the network resource if the network resource is available.

According to a third aspect of the present invention, the logic circuitry is arranged to store the request in a waiting memory if the network resource is determined to be unavailable, make a search through the data base to determine, when an existing connection is released, whether the network resource is available, and cause the ATM switches to establish the connection using the network resource and remove the request from the waiting memory if the network resource is available.

BRIEF DESCRIPTION OF THE DRAWINGS

The present invention will be described in further detail with reference to the accompanying drawings, in which.

DETAILED DESCRIPTION

Figure 1:
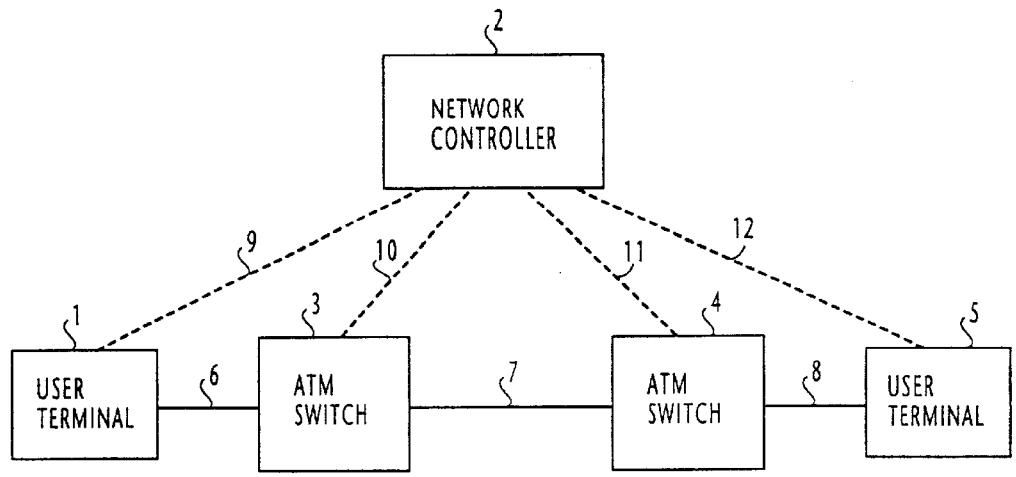
FIG. 1 is a block diagram of an ATM switch network according to the present invention.

Referring to FIG. 1, an ATM (asynchronous transfer mode) switched network of the present invention is illustrated as a simplified example for the purpose of disclosure. Two ATM switches 3 and 4, interconnected by a communication link 7, are illustrated as switching nodes of the network for service many end user terminals. Only two user terminals 1 and 5 are illustrated for simplicity, these terminals being connected to the switching nodes 3 and 4 via subscriber lines 6 and 8, respectively. All ATM nodes and user terminals are connected to a network controller 2 via logical (virtual) links 9, 10, 11 and 12. Logical links 9 and 12 of the user terminals are established via ATM nodes 3 and 4.

Figure 2:
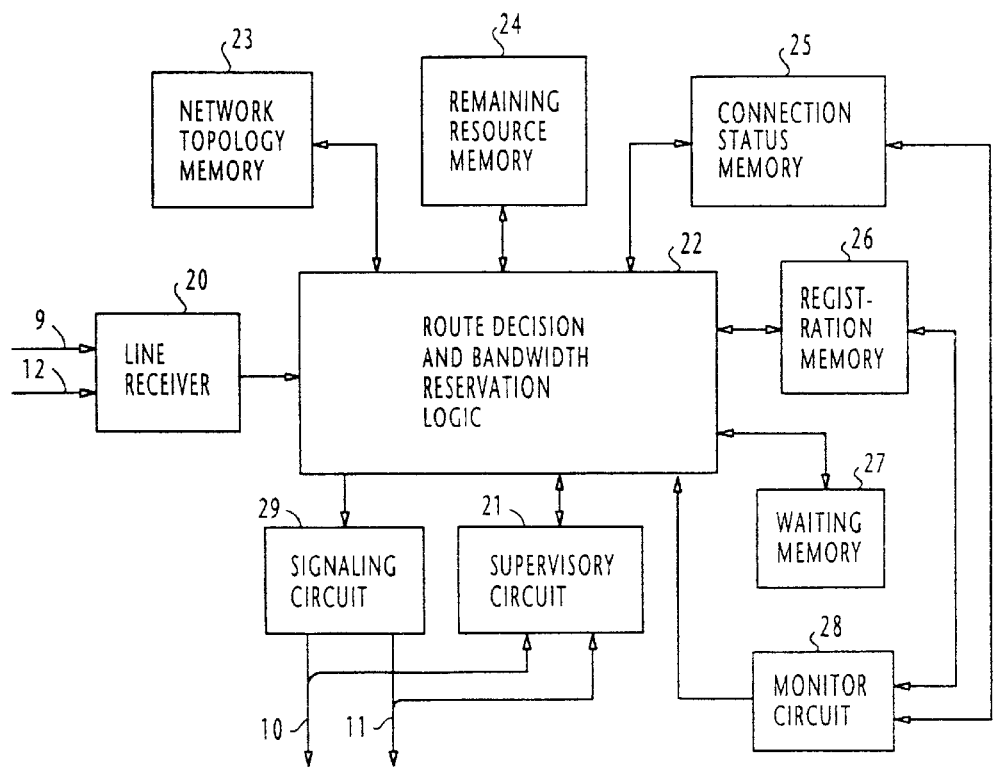
FIG. 2 is a block diagram of the network management apparatus of FIG. 1.

As shown in FIG. 2, the network controller 2 comprises a line receiver 20 to which the logical links 9 and 12 are terminated for receiving reservation requests from the user terminals. A supervisory circuit 21 is connected to the logical links 10 and 11 to monitor lines and switching equipment. A route decision and bandwidth reservation (RDBR) logic circuit 22 is provided to receive reservation requests from line receiver 20 and a monitor report from the supervisory circuit 21. The RDBR logic circuit 22 is associated with a network topology memory 23, a remaining resource memory 24, a connection status memory 25, a registration memory 26, and a waiting memory 27. A monitor circuit 28 is connected to the registration memory 26 to monitor the reservation requests stored in memory 26 and supplies an interrupt command to the logic circuit 22 when one of the start and end times of a reservation matches the time of day. Monitor circuit 28 is further connected to the connection status memory 25 to monitor the status of established connections and supplies an interrupt command to the logic circuit 22 when any of the established connections is released.

A signaling circuit 29 is provided for transmitting signaling packets to the ATM switches via logical links 10 and 11 to establish switched virtual connections along routes determined by the RDBR logic circuit 22 using the Simple Network Management Protocol (SNMP) which is currently in use for establishing permanent virtual connections (PVC). According to a first aspect of the present invention, each ATM node responds to the signaling packet for establishing a switched virtual connection to the destination terminal and informing the source terminal of a virtual channel identifier/virtual path identifier (VCI/VPI) to be used during the subsequent transmission of ATM message cells. After a switched virtual connection is established by the ATM switches under control of the network controller 2, each ATM switch examines the header of user-transmitted ATM message cells for routing them along the established connection.

According to a second aspect of the present invention, reservation requests are classified into a high-cost, priority reservation class and a low-cost, normal reservation class, for making a reservation of an end-to-end communication through the ATM network. The priority reservation class ensures a high degree of certainty for obtaining the requested bandwidth. If this class is requested, the RDBR logic circuit 22 immediately begins hunting for a route having the requested bandwidth. The normal reservation class, on the other hand, provides a low degree of certainty for obtaining the requested bandwidth. On receiving this request, the RDBR logic circuit 22 waits until the start of the requested communication before hunting for a route having the requested bandwidth.

Figure 3:
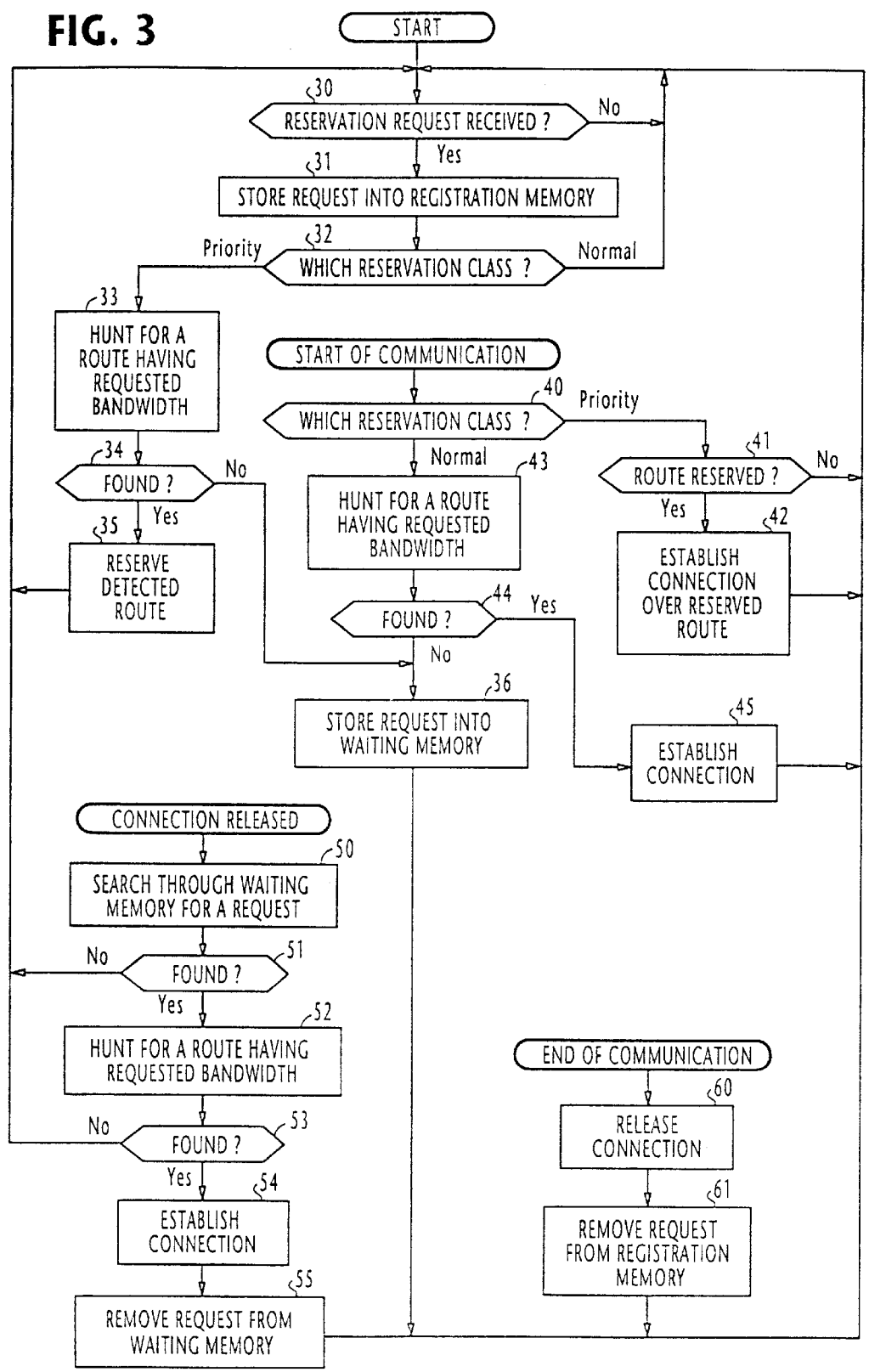
FIG. 3 is a flowchart illustrating the operation of the route decision and bandwidth reservation (RDBR) logic circuit.

The operation of the RDBR logic circuit 22 will be explained with the aid of a flowchart shown in FIG. 3. When a reservation request is received (step 30), flow proceeds to step 31 to store the request in the registration memory 26. The reservation request indicates the identity of the source user terminal (source address), the identity of a destination user terminal (destination address), a network resource, such as bandwidth, to be reserved, times of day respectively indicating the beginning and expiry of a communication to be reserved over a route between the source and the destination terminals, and a priority/normal reservation class.

At step 32, the stored request is examined to determine whether it demands the priority class or the normal class. If the request is demanding the normal class, flow returns to the starting point of the routine to wait until the logic circuit 22 is triggered by the monitor circuit 28 in order to server reservation requests from other user terminals.

If the request is demanding the priority class, flow proceeds from step 32 to step 33 to hunt for a route having the requested bandwidth using network topology data stored in the network topology memory 23 and currently available network resource data stored in the remaining resource memory 24. If there is one (step 34), flow proceeds to step 35 to reserve the bandwidth of the detected route in the remaining resource memory 24. If the decision at step 34 is negative, the reservation request is stored in a queue in the waiting memory 27 (step 36), and flow returns to the starting point of the routine.

When the beginning of a communication requested by either class of a request stored in the registration memory is detected by monitor circuit 28, the logic circuit 22 is triggered and starts its operation at step 40 by determining which reservation class the request is demanding. If the priority class is requested, flow proceeds from step 40 to step 41 to check to see if the requested route is reserved. If so, flow proceeds from step 41 to step 42 where the logic circuit 22 commands the signaling circuit 29 to operate the ATM switches to establish a connection over the reserved route. In addition, the logic circuit 22 stores the connection status of the request into connection status memory 25, and returns to the starting point of the routine. If the decision at step 41 is negative, flow returns to the starting point of the routine.

If the request stored in the registration memory is demanding the normal class, flow branches at step 40 to step 43 to hunt for a route having the requested bandwidth. If such a route is found (step 44), a connection is established over the detected route and the remaining resource memory 24 and connection status memory 25 are updated accordingly (step 45). Otherwise, the request is placed into a queue in the waiting memory 27 (step 36).

The reservation requests stored in the waiting memory 27 are served by the logic circuit 22 whenever any of the already established connections is released. When this occurs, the logic circuit 22 is triggered by the monitor circuit 28 and starts its operation at step 50 by making a search through the waiting memory 27 for a stored request. If a user is found in the waiting memory (step 51), flow proceeds to step 52 to hunt for a route having the bnadwidth requested by the request stored in the waiting memory. If such a route is detected (step 53), a connection is established over the detected route and the remaining resource memory 24 and connection status memory 25 are updated accordingly (step 54) and the request is removed from the waiting memory (step 55). If the decision at steps 51 and 53 are negative, flow returns to the starting point of the routine.

When the expiry of a communication of a request of either normal or priority class is detected in the registration memory 26 by the monitor circuit 28, the logic circuit 22 is triggered to start its operation at step 60 by releasing the connection established for the request and removing the request from the registration memory 26 (step 61), and flow returns to the starting point of the routine.

Figure 4:
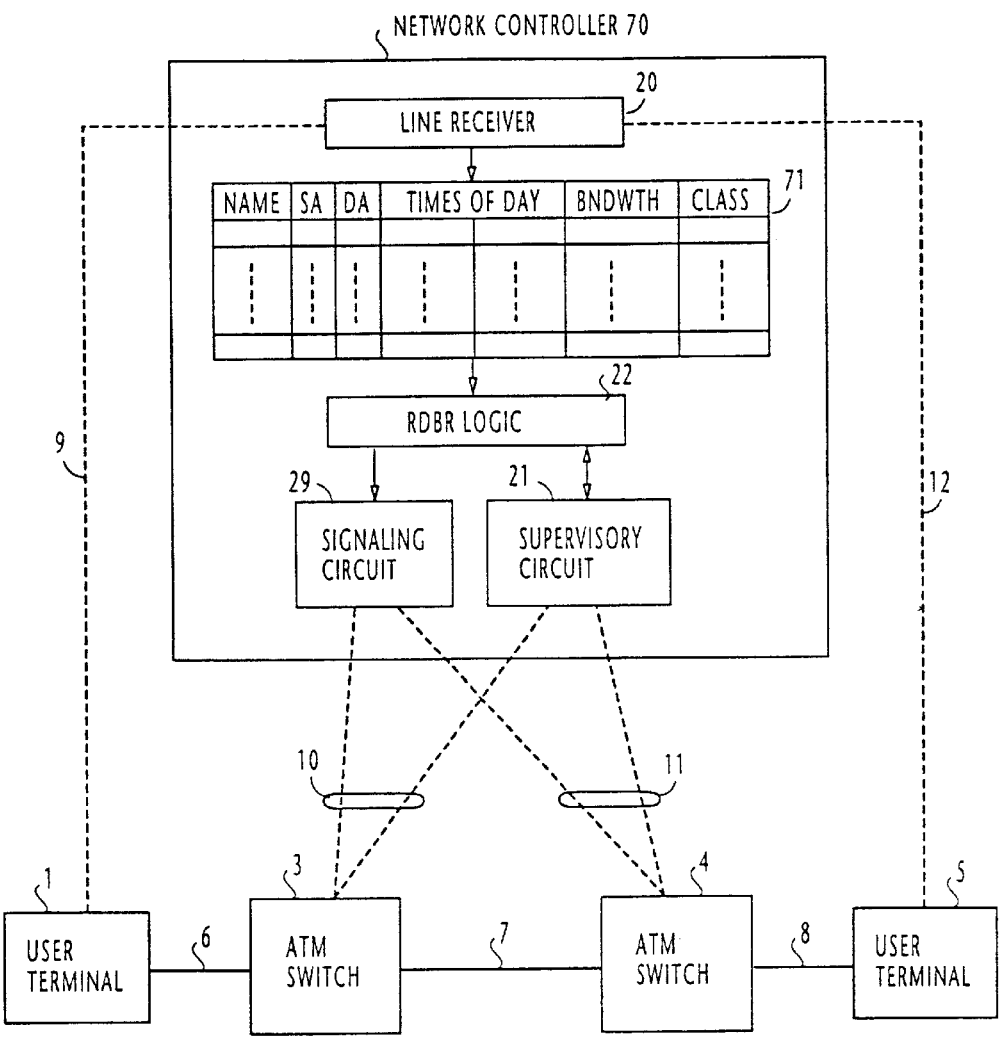
FIG. 4 is a block diagram of a modified embodiment in which a mapping table is located in the network controller for translating a user-transmitted code name to a corresponding set of reservation data items.

Since the reservation request contains a number of reservation data items, it is of time-consuming and tedious affair to manually enter reservation data if calls are frequently set up using different patterns of reservations. Therefore, from the customer service viewpoint, it is important to simplify the reservation procedure. FIG. 4 illustrates an embodiment that simplifies the reservation procedure.

According to the embodiment of FIG. 4, the network controller, indicated at 70, additionally includes a mapping table 71 connected between line receiver 20 and the RDBR logic circuit 22. In the table 71, a plurality of code names are mapped to corresponding reservation data items each including a source address, a destination address, times of day for the beginning and expiry of a scheduled communication, a desired bandwidth and a reservation class. When transmitting a reservation request, the user terminal only needs to enter a desired code name, instead of entering reservation data. The code name is transmitted to the network controller 70, where it is translated by the mapping table 71 to corresponding reservation data and applied to the logic circuit 22.

Figure 5:
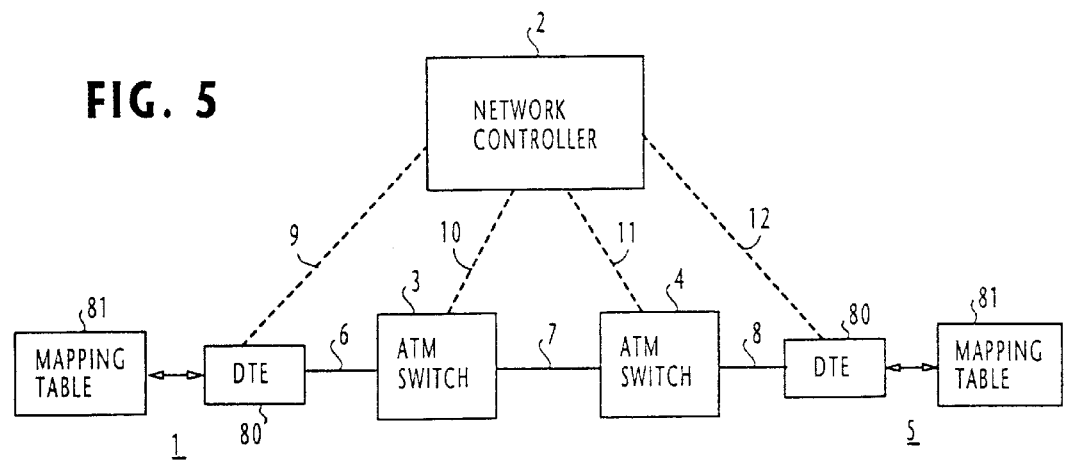
FIG. 5 is a block diagram of the ATM network in which the mapping table is located in the user's premises.

The mapping table may be located at the customer's premises. As illustrated in FIG. 5, each of the user terminals 1 and 5 includes a mapping table 81 connected to the data terminal equipment 80. When transmitting a reservation request, each user terminal enters a desired code name which is translated by the mapping table 81 to corresponding reservation data, which is then transmitted to the network controller 2.

What is claimed is:

1. A network controller for handling end-to-end network resource reservations for subscribers in an ATM communication network including a plurality of subscriber terminals, and a plurality of ATM switches interconnected by communication links, the controller being comprised of:

a first memory device for storing resource reservation requests; and logic circuit which manages the resource reservation requests and establishes requested connections, the logic circuitry being responsive to a reservation request from a subscriber terminal to store the request in the first memory device, to operate the ATM switches to establish and end-to-end connection for the requesting subscriber terminal at a scheduled start time if the requested resource is available, to inform the requesting subscriber terminal of a virtual channel designation/virtual path designation of the established connection to be used for transmission of messages, to release the connection at a scheduled end time, and to remove the record of the request from the first memory device when the connection is released.

2. The network controller described in claim 1, further including:

a database for storing data pertaining to the topology of the network and available network resources;

and wherein the logic circuitry is further responsive to a reservation request to search the database to determine if the requested resource is available, and if so, to reserve the requested resource, and to update the database to reflect establishment of the requested reservation.

3. The network controller described in claim 2, further including a second memory device, and wherein:

the logic circuitry is operative to store a reservation request in the second memory device if a search of the database in response to the reservation request indicates that the requested resource is not available, and wherein the logic circuitry is responsive to an existing connection being released to perform a further search of the database, and, if the further search indicates that the requested resource is available, to operate the ATM switches to establish the requested connection and to remove the request from the second memory device.

4. The network controller described in claim 1, wherein the reservation request includes a reservation priority designation; and wherein the logic circuitry is further responsive to a first priority designation to determine whether the requested resource is available immediately upon receipt of the reservation request and to reserve the requested resource at that time if it is available, and responsive to a second different priority designation to determine whether the requested resource is available at the scheduled start time specified in the reservation request.

5. A network controller for making resource reservations in an ATM communication network formed of a plurality of subscriber terminals, and a plurality of ATM switches interconnected by communication links, the controller being comprised of:

a database for storing data pertaining to the topology of the network and available network resources;

a supervisory circuit which constantly monitors the communication links;

a registration memory which stores received reservation requested; and route decision and resource reservation logic circuitry;

the logic circuitry being responsive to detection of a fault condition by the supervisory circuit to update the database;

responsive to a reservation request from a subscriber terminal for an end-to-end network resource to be available between a scheduled start time and a scheduled end time, to search the database, and to update the database to reflect establishment of the requested reservation if the requested resource is available, responsive to an existing reservation in the database to operate the ATM switches to establish an end-to-end connection using the reserved network resource at the scheduled start time, and to inform the requesting subscriber terminal of a virtual channel designation/virtual path designation of the established connection to be used for transmission of messages, to release the connection at the scheduled end time, and to remove the request from the registration memory.

6. The network controller described in claim 5, wherein the reservation request further includes a reservation priority designation; and wherein the logic circuitry is further responsive to a first priority designation to determine whether the requested resource is available immediately upon receipt of the reservation request and to reserve the requested resource at that time if it is available, and responsive to a second different priority designation to determine whether the requested resource is available at the scheduled start time specified in the reservation request.

7. The ATM communication network described in claim 6, wherein the reservation request is in the form of a code name, and wherein the controller further includes a circuit which converts the code name to a plurality of resource reservation data items.

8. The network controller described in claim 5, wherein:

the logic circuitry is further operative to store a reservation request in a waiting memory if the search of the database in response to the reservation request indicates that the requested resource is not available, responsive to an existing connection being released to perform a further search of the database, and responsive to the further search indicating that the requested resource is available to operate the ATM switches to establish the requested connection and to remove the request from the waiting memory.

9. The network controller described in claim 5, wherein the reservation request is generated in the form of a code name, and wherein the controller further includes a circuit which converts the code name to a plurality of resource reservation data items.

10. The network controller described in claim 5, wherein the reservation request is generated in the form of a code name, and wherein the subscriber terminal includes a circuit which converts the code name to a plurality of resource reservation data items and transmits the data items to the network controller.

11. An ATM communication network comprised of:
a plurality of subscriber terminals;
a plurality of communication links;
a plurality of ATM switches which interconnect the communication links; and
a network controller,
the network controller being comprised of:
a database for storing data pertaining to the topology of the network and available network resources;
a registration memory; and
route decision and resource reservation logic circuitry,
the subscriber terminals being operative to transmit reservation requests to the controller for end-to-end network resources to be allocated to the requesting terminal between a scheduled start time and a scheduled end time, the request including a reservation priority designation;
the route decision and resource reservation logic circuitry being responsive to a reservation request to store the request in the registration memory,
responsive to a first priority designation to search the database to determine whether the requested resource is available immediately upon receipt of the reservation request, or
responsive to a second different priority designation to search the database to determine whether the requested resource is available at the scheduled start time specified in the reservation request; and
responsive to an existing reservation to operate the ATM switches to establish an end-to-end connection using the reserved network resource at the scheduled start time, to inform the requesting subscriber source terminal of a virtual channel designation/virtual path designation of the established connection to be used for subsequent transmission of messages, to release the connection at the scheduled end time, and to remove the request from the registration memory when the connection is released.

12. A method of making resource reservations in an ATM communication network formed of a plurality of subscriber terminals, a plurality of ATM switches interconnected by communication links and a controller including a database for storing data pertaining to the topology of the network and available network resources, the method including the steps of:
receiving a reservation request from a subscriber terminal for an end-to-end network resource between a start time and an end time;
storing the reservation request in a memory device;
searching the database, and updating the database to reflect establishment of the requested reservation if the requested resource is available;
establishing an end-to-end connection through the ATM switches at the scheduled start time based on the reserved network resource;
informing the requesting subscriber terminal of a virtual channel designation/virtual path designation of the established connection to be used for transmission of messages;
releasing the connection at the scheduled end time; and
removing the request from the memory device when the connection is released.

13. The method described in claim 12, further including the steps of:
receiving the reservation request in the form of a code name; and
converting the received code name to a plurality of resource reservation data items.

14. A method of making resource reservations in an ATM communication network formed of a plurality of subscriber terminals, a plurality of ATM switches interconnected by communication links, the method including the steps of:
receiving a reservation request for an end-to-end network resource between a scheduled start time and a scheduled end time from a subscriber terminal, the request including a reservation priority designation;
storing the reservation request in a first memory;
identifying the priority designation included in the reservation request;
if the request includes a first priority designation, searching the database immediately upon receipt of the reservation request, and, if the requested resource is available, updating the database to reserve the requested resource, and establishing an end-to-end connection through the ATM switches at the scheduled start time based on the reserved network resource; or
if the request includes a second priority designation, searching the database at the scheduled start time, and if the network resource is available, establishing an end-to-end connection through the ATM switches at the scheduled start time based on the reserved network resource;
informing the requesting subscriber terminal of a virtual channel designation/virtual path designation of the established connection to be used for transmission of messages;
releasing the connection at the scheduled end time; and
removing the request from the first memory when the connection is released.

15. The method described in claim 14, further including the steps of:
storing the request in a second memory if the requested network resource is not available at the time the database is searched;
performing a further search of the database when an existing connection is released to determine if the requested resource has become available, and if so, establishing the end-to-end connection through the ATM switches based on the reserved network resource at that time, and removing the request from the second memory.

16. The method described in claim 14, wherein the step of receiving a reservation request from a subscriber terminal further includes the steps of:
receiving the reservation request in the form of a code name; and
converting the received code name into a plurality of resource reservation data items.

* * * * *

UNITED STATES PATENT AND TRADEMARK OFFICE
CERTIFICATE OF CORRECTION

PATENT NO. : 6,226,263 B1
DATED : May 1, 2001
INVENTOR(S) : Toshio Iwase et al.

It is certified that error appears in the above-identified patent and that said Letters Patent is hereby corrected as shown below:

<u>Title page,</u>
Item [73], Assignee: after "NEC Corporation, Tokyo (JP)" insert -- Nippon Telegraph and Telephone Corporation, Tokyo (JP) --

Signed and Sealed this

Eighteenth Day of June, 2002

Attest:

Attesting Officer

JAMES E. ROGAN
*Director of the United States Patent and Trademark Office*